United States Patent
Gu et al.

(10) Patent No.: US 8,417,684 B2
(45) Date of Patent: Apr. 9, 2013

(54) METHOD, SYSTEM, AND DEVICE FOR SEARCHING FOR INFORMATION AND METHOD FOR REGISTERING VERTICAL SEARCH ENGINE

(75) Inventors: Chong Gu, Shenzhen (CN); Jiangtao Jia, Shenzhen (CN); Guobing Min, Shenzhen (CN); Xiaoyi Dong, Shenzhen (CN); Tieying Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/043,107

(22) Filed: Mar. 8, 2011

(65) Prior Publication Data

US 2011/0161307 A1 Jun. 30, 2011

Related U.S. Application Data

(63) Continuation of application No. PCT/CN2009/073539, filed on Aug. 26, 2009.

(30) Foreign Application Priority Data

Sep. 8, 2008 (CN) .......................... 2008 1 0215768

(51) Int. Cl.
*G06F 17/30* (2006.01)

(52) U.S. Cl.
USPC .......................................................... 707/706

(58) Field of Classification Search ........... 707/706–710
See application file for complete search history.

(56) References Cited

U.S. PATENT DOCUMENTS

2004/0068460 A1 4/2004 Feeley et al.
2007/0033167 A1 2/2007 Basu et al.
2007/0100802 A1* 5/2007 Celik ................................. 707/3
2007/0130018 A1 6/2007 Nishizawa
2008/0154877 A1* 6/2008 Joshi et al. ........................ 707/5
2009/0216716 A1* 8/2009 Punaganti Venkata et al. ... 707/3

FOREIGN PATENT DOCUMENTS

| CN | 1677389 A | 10/2005 |
|---|---|---|
| CN | 1731396 A | 2/2006 |
| CN | 1832590 A | 9/2006 |
| CN | 1858741 A | 11/2006 |

(Continued)

OTHER PUBLICATIONS

Supplementary European Search Report dated Feb. 17, 2012 in connection with European Patent Application No. EP 09 81 1028.

(Continued)

*Primary Examiner* — Thu-Nguyet Le

(57) ABSTRACT

In the field of communications, a method, a system, and a device for searching for information, and a method for registering a vertical search engine are provided. The method for searching for information includes the following steps. A first search request sent by a user is received. A logic node is determined according to attribute information in the first search request. A vertical search engine selected by the logic node for the user is received. A second search request is sent to the vertical search engine. The method for registering the vertical search engine includes the following steps. A mobile search server receives and saves first registration information sent by the vertical search engine. Location information of a logic node corresponding to the vertical search engine is determined according to the first registration information. Second registration information is sent to the logic node according to the location information.

21 Claims, 10 Drawing Sheets

FOREIGN PATENT DOCUMENTS

| | | |
|---|---|---|
| CN | 1917540 A | 2/2007 |
| CN | 101052181 A | 10/2007 |
| CN | 101114294 A | 1/2008 |
| CN | 101556588 A | 10/2009 |
| WO | WO 2007/120781 A2 | 10/2007 |
| WO | WO 2009/124480 A1 | 10/2009 |

OTHER PUBLICATIONS

A. Reyes, et al., "Mobile Access to the Services in Ambient Networks", Jul. 21, 2008, 4 pages.

Klaus Wehrle, et al., "Distributed Hash Tables", Jan. 1, 2005, 15 pages.

D. Royo, et al., "SNAF: A Service Naming and Addressing Framework for SerAN Platform", Sep. 24, 2007, pp. 30-35.

Jianming Lv, et al., "WonGoo: A Pure Peer-to-Peer Full Text Information Retrieval System Based on Semantic Overlay Networks", Proceedings of the Third IEEE International Symposium on Network Computing and Applications (NCA'04), Aug. 30, 2004, 8 pages.

Daniel Dreilinger, et al., "Experiences with Selecting Search Engines Using Metasearch", ACM Transactions on Information Systems, vol. 15, No. 3, Jul. 1997, pp. 195-222.

Written Opinion of the International Searching Authority dated Dec. 3, 2009 in connection with PCT Application No. PCT/CN2009/073539.

International Search Report dated Dec. 3, 2009 in connection with PCT Application No. PCT/CN2009/073539.

* cited by examiner

METHOD, SYSTEM, AND DEVICE FOR SEARCHING FOR INFORMATION AND METHOD FOR REGISTERING VERTICAL SEARCH ENGINE

CROSS-REFERENCE TO RELATED APPLICATIONS

This application is a continuation of International Application No. PCT/CN2009/073539, filed on Aug. 26, 2009, which claims priority to Chinese Patent Application No. 200810215768.5, filed on Sep. 8, 2008, both of which are hereby incorporated by reference in their entireties.

TECHNICAL FIELD

The present invention relates to the field of communications, and more particularly to a method, a system and a device for searching for information and a method for registering a vertical search engine.

BACKGROUND

With fast development of network technology, network information increases explosively, and searching for information is like fishing a needle out of the ocean. Therefore, a search engine has become an indispensable tool for retrieving information.

Although an excellent search engine provides a large quantity of information resources and helps users to search for information with the support of a priority algorithm, many excellent search engines are unable to provide precise search services for users. Information in the network becomes increasingly richer, and development of search engines also tends to be professionalized and territorialized. The professional member search engines maintain their own web page databases. Data storage is distributed, and capability of each search engine is only limited to its own web page database. In the field of mobile search, a search request from a user is very purposeful, and search services are required to meet requirements of quickness, preciseness, and accuracy. It becomes an important topic how to effectively utilize capabilities of localized professional search engines during mobile search and integrate the engines.

In the field of mobile search, usually vertical search engines are registered according to territories. For example, 114 platforms of China Telecom, referring to FIG. 1, can provide various types of comprehensive service for users, such as a telephone number query service, and services related to dining and air ticket booking. Each platform manages information of its own territory. Taking the service related to dining as an example, although both vertical search engines registered on 114 platforms in Shenzhen and Shanghai can provide the service related to dining, the vertical search engine providing the service related to dining in Shenzhen is registered on the 114 platform in Shenzhen and is managed by the 114 platform in Shenzhen; and the vertical search engine providing the service related to dining in Shanghai is registered on the 114 platform in Shanghai and is managed by the 114 platform in Shanghai.

The prior art at least has the following problems.

1) A vertical search engine registered on a mobile search platform in a certain territory cannot provide services for mobile search platforms in other territories. The vertical search engines registered in different territories cannot share the information, so that the resources are wasted.

2) The vertical search engines that are registered in different territories and provide the same type of service cannot be managed and dispatched uniformly.

3) Mobile search platforms in different territories cannot be interconnected.

SUMMARY

In order to make vertical search engines registered in different territories share information to prevent from wasting resources, the embodiments of the present invention provide a method, a system, and a device for searching for information and a method for registering a vertical search engine. The technical solutions are described in the following:

A method for searching for information is provided, which includes the following steps:

A first search request sent by a user is received.

A logical node is determined according to attribute information in the first search request.

Information of a vertical search engine selected by the logical node for the user is received.

A second search request is sent to the vertical search engine.

The logical node stores information of vertical search engines of the same attribute information in a network.

A method for registering a vertical search engine is provided, which includes the following steps:

A mobile search server receives and saves first registration information sent by a vertical search engine.

Location information of a logical node corresponding to the vertical search engine is determined according to the first registration information.

Second registration information is sent to the logical node according to the location information.

The logical node stores information of vertical search engines of the same attribute information in a network.

A system for searching for information is provided, which includes a mobile search server and a vertical search engine.

The mobile search server is configured to receive a first search request sent by a user, determine a logical node according to attribute information in the first search request, receive information of a vertical search engine selected by the logical node for the user, and send a second search request to the vertical search engine, in which the logical node stores information of vertical search engines of the same attribute information in a network.

The vertical search engine is configured to receive the second search request sent by the mobile search server.

A system for registration is provided, which includes a mobile search server and a vertical search engine.

The vertical search engine is configured to send first registration information to the mobile search server, in which the first registration information includes a service type and meta index of the vertical search engine, address information of the vertical search engine, and information of territories served by the vertical search engine.

The mobile search server is configured to receive and save the first registration information sent by the vertical search engine; determine location information of a logical node corresponding to the vertical search engine according to the first registration information; and send second registration information to the logical node according to the location information, in which the logical node stores information of vertical search engines of the same attribute information in a network, and the second registration information includes the first registration information and address information of the mobile search server.

A mobile search server is provided, which includes a first receiving module, a logical node determining module, a second receiving module, and a sending module.

The first receiving module is configured to receive a first search request sent by a user.

The logical node determining module is configured to determine a logical node according to attribute information in the first search request.

The second receiving module is configured to receive information of a vertical search engine selected by the logical node for the user.

The sending module is configured to send a second search request to the vertical search engine.

The logical node stores information of vertical search engines of the same attribute information in a network.

A mobile search server is provided, which includes a registration information module, a logical node determining module, and a sending module.

The registration information module is configured to receive and save first registration information sent by a vertical search engine.

The logical node determining module is configured to determine location information of a logical node corresponding to the vertical search engine according to the first registration information.

The sending module is configured to send second registration information to the logical node according to the location information.

The logical node stores information of vertical search engines of the same attribute information in a network.

A directory server is provided, which includes a statistic module, a relevance relation module, and a logical node determining module.

The statistic module is configured to record capability information and address information of each mobile search server in a network.

The relevance relation module is configured to establish an association relation between each mobile search server and each logical node in a network according to the capability information and the address information.

The logical node determining module is configured to determine that location information of the logical node is the address information of the mobile search server related to the logical node according to the association relation.

A vertical search engine is provided, which includes a registration information sending module and a receiving module.

The registration information sending module is configured to send registration information to a mobile search server, in which the registration information includes a service type and meta index of the vertical search engine, address information of the vertical search engine, and information of territories served by the vertical search engine.

The receiving module is configured to receive a response message returned by the mobile search server.

Beneficial effects of the technical solutions according to the present invention are described as follows:

The vertical search engines that are registered in different territories and provide the same service are managed uniformly through the logical node, so that the information is shared and the resources are prevented from being wasted. The mobile search servers are interconnected by establishing the association relation between the logical node and the mobile search server. The vertical search engines that are registered in different territories and provide the same service type are managed and dispatched uniformly by sending registration information of the vertical search engine to a corresponding logical node.

DETAILED DESCRIPTION

To make the technical solution, objectives and merits of the present invention clearer, the embodiments of the present invention are described in detail with reference to the accompanying drawings.

First Embodiment

In order to make vertical search engines registered in different territories share information, a method for searching for information is provided, according to this embodiment. In the method, the vertical search engines that are registered in different territories and provide the same service are managed uniformly through a logical node, so that the information is shared. In order to implement the method, the vertical search engine needs to be registered in a mobile search server in a network, and an association relation between the logical node and the mobile search server needs to be established.

The vertical search engine according to the present invention is a search engine that provides valuable information and relevant services for a specific field, a specific group of people, or a specific demand, and characteristics of the vertical search engine are that the vertical search engine is "professionalized", "specialized", and "deepened" and bears features of an industry. In this embodiment, the vertical search engine may be a professional search engine, a general search engine, or a member search engine, and is not limited thereto.

It is described in the following how to establish the association relation between the logical node and the mobile search server to interconnect the mobile search servers. Two methods for establishing the association relation are provided for different network structures according to this embodiment. A first method for establishing the association relation between the logical node and the mobile search server by adopting a Distributed Hash Table (DHT) technology is described in the following.

Figure 1:
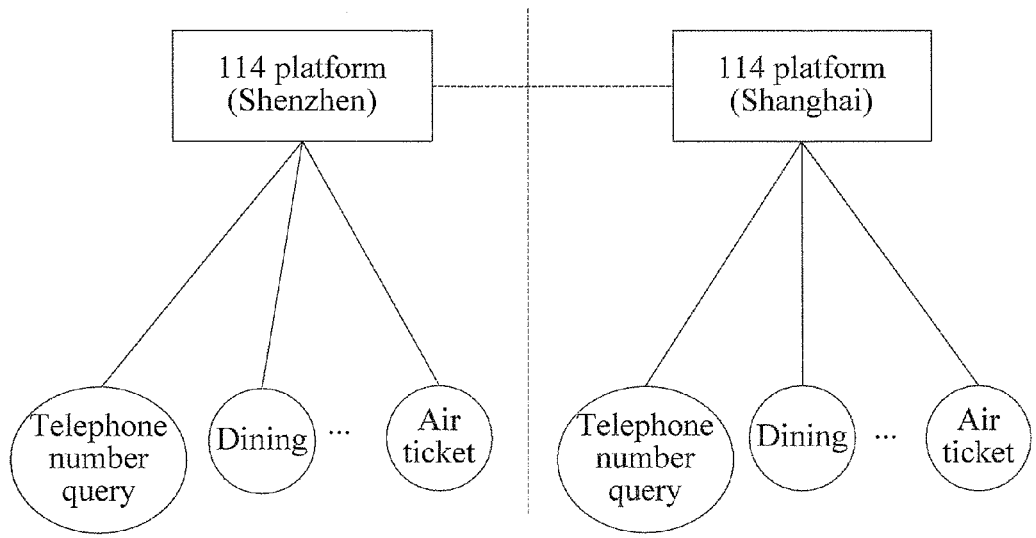
FIG. 1 is a schematic diagram of 114 platforms in the prior art.
Figure 2:
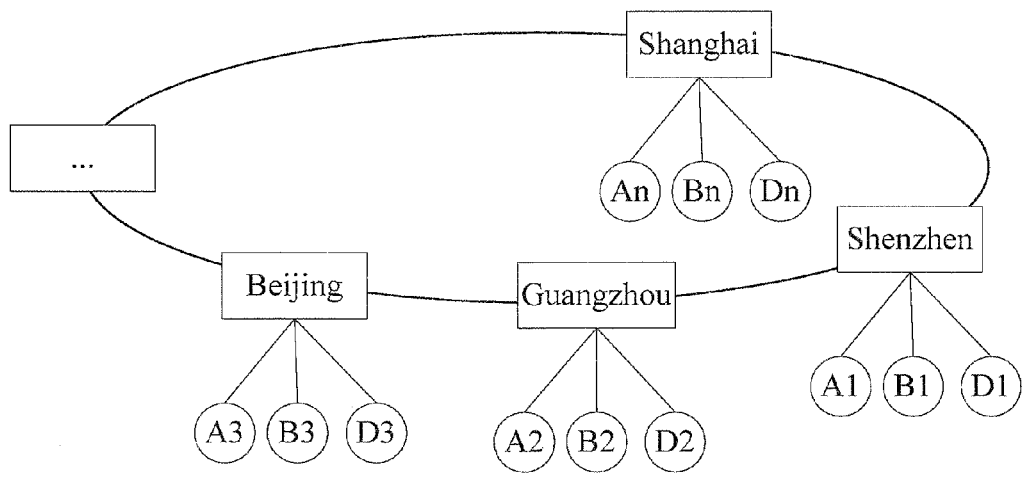
FIG. 2 is a schematic structural view of a network according to a first embodiment of the present invention.
Figure 3:
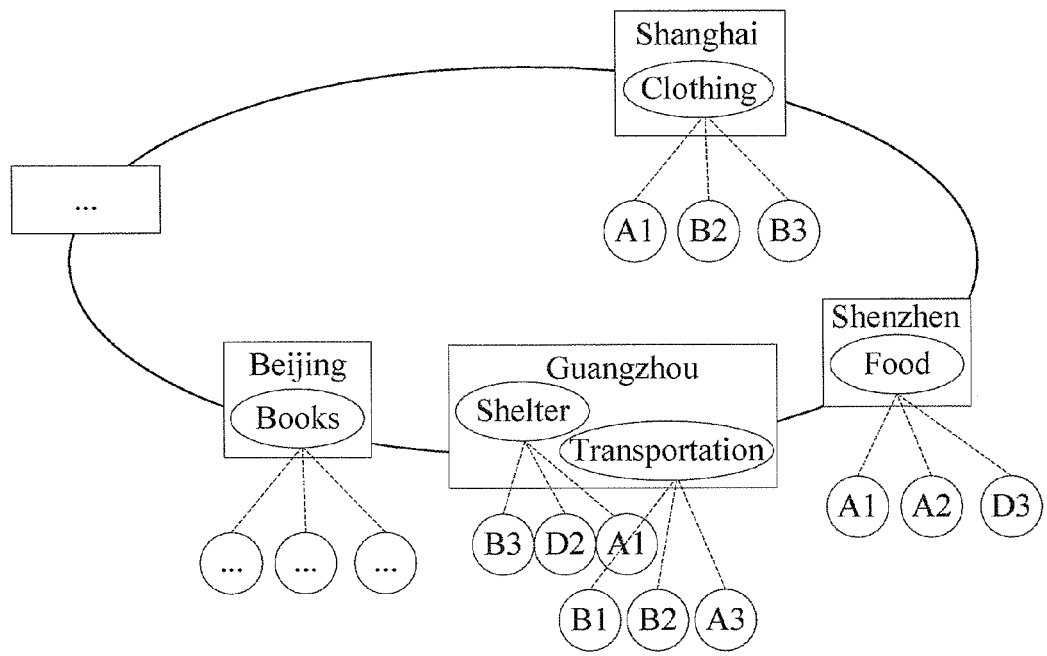
FIG. 3 is a schematic structural view of a network with logical nodes according to the first embodiment of the present invention.

Referring to FIG. 2, each physical node in the network represents a mobile search server deployed in different territories, such as a mobile search server in Beijing, Guangzhou, Shanghai, or Shenzhen. Each mobile search server manages one or more vertical search engines, for example, the mobile search server of Shenzhen manages vertical search engines A1, B1, and D1, and each vertical search engine provides users with search services of different service types and fields. Referring to FIG. 3, logic nodes in the network, such as clothing, food, shelter, transportation, and books, are nodes divided by attribute information. Specifically, the attribute information may be service information (such as service type); or service information and territorial information; or service information, territorial information, and operator identification. The logical node stores information of the vertical search engines of the same attribute information in the network. The service type provided by the vertical search engine may also be a type path of a service type tree, such as "leisure/clothing/female clothing", or may be formed by one or more descriptive words, such as leisure, clothing, and female clothing. Each physical node maintains one or more logical nodes at the same time, for example, the mobile search server of Guangzhou maintains two logical nodes being shelter and clothing. Each logical node saves relevant information of vertical search engines of the same service type, for example, the logical node being food stores information of three vertical search engines A1, A2, and D3. If the same vertical search engine can provide different service types, the vertical search engine belongs to one or more logical nodes, for example, the vertical search engine A1 that can provide services of food and shelter at the same time belongs to the logical node being shelter in Guangzhou and the logical node being food in Shenzhen. Furthermore, the logical node may be constructed by service type, or by a combination of the territorial information and the service type, or a combination of the operator information, the territorial information, and the service type.

Figure 4:
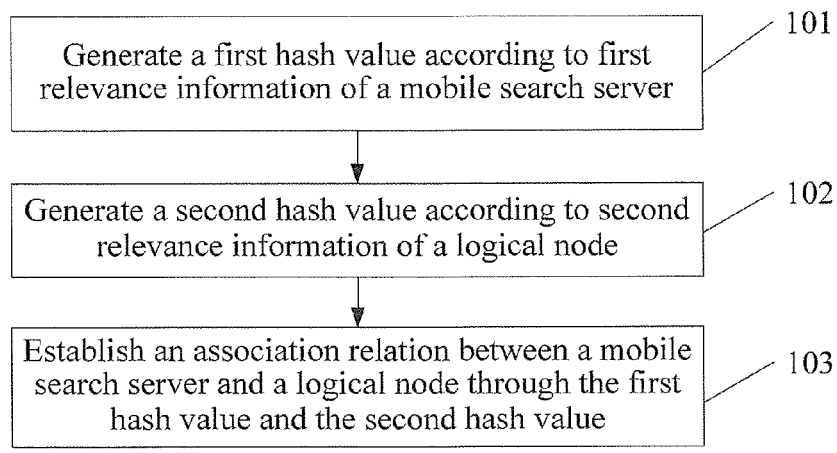
FIG. 4 is a flow chart of a method for establishing an association relation between a logical node and a mobile search server according to the first embodiment of the present invention.

Based on the network structure, referring to FIG. 4, the method for establishing the association relation between the logical node and the mobile search server by adopting the DHT technology includes the following steps:

Step 101: Generate a first hash value according to first relevance information of a mobile search server.

Specifically, the first relevance information may be identification information or address information of the mobile search server, such as, an Internet Protocol (IP) address. The first hash value can be obtained from the first relevance information by performing a hash operation.

Furthermore, the first relevance information of different mobile search servers is different, and different first hash values are obtained by performing the HASH operation.

Step 102: Generate a second hash value according to second relevance information of the logical node.

Specifically, the second relevance information may be one-dimension or multi-dimension information. For example, the second relevance information may be one-dimension information service information (such as a service type); or two-dimension information service information (such as a service type) and territorial information; or three-dimension information operator identification, territorial information, and service information (such as a service type).

Taking the three-dimension information as an example, the logical node is constructed by three-dimension information being <operator ID, territorial information, service type>. A hash value range of physical nodes in the whole network is allocated according to the operator ID information. The hash value ranges corresponding to each operator ID are not overlapped, and a hash value of the information being <operator ID, territorial information, service type> is calculated, and is made to be within the hash value range corresponding to the operator ID. Furthermore, when an inclusion situation exists in territories of the service types provided by two vertical search engines, for example, a search engine provides food search in Guangdong and a search engine provides food search in Shenzhen, and the inclusion relation exists in the search territories provided by the two vertical search engines (that is, Guangdong includes Shenzhen), it is possible to regard the search engine providing food search in Guangdong as a search engine that provides food search not only in Guangdong but also in Shenzhen. During registering, descriptions of engines, <China Mobile ID, Guangdong, food> and <China Mobile ID, Shenzhen, food>, are added, so as to register in different logical nodes. Through this type of division, a whole mobile search network can be managed by each operator according to territories, and the searching the whole mobile search network is realized through logical nodes divided by different operators.

Step 103: Establish an association relation between the mobile search server and the logical node by using the first hash value and the second hash value.

Specifically, a value being closest to a second hash value of a certain logical node is found among the first hash values corresponding to all the mobile search servers, and the logical node is then managed by a mobile search server being closest to the first hash value, that is, the association relation between the two is established.

Furthermore, when the logical nodes are mapped to the mobile search servers by using a hash algorithm, multiple logical nodes may be mapped to the same mobile search server because of the use of the hash algorithm. Therefore, other hash algorithms may be selected, so that the mapping result is relatively balanced. Alternatively, during mapping, logical nodes may be allocated evenly according to factors, such as utilization situations and performances of logical nodes of different attribute information.

Furthermore, addition and deregistration situations of the mobile search servers in the network may lead to a change of the association relation between the mobile search server (physical node) and the logical node. When entering a structured network, a new mobile search server gives a notification to other mobile search server nodes in the network, and obtains information in the corresponding network, such as information of an adjacent successive node. The adding of the new mobile search server node may affect an existing mapping relation between the logical node and the mobile search server. The logical node that is closest to the first hash value of the new mobile search server is transferred to the new mobile search server node through the DHT algorithm, and the mobile search server node saves content of the logical node.

When a mobile search server is deregistered from a structured network, the mobile search server needs to give the notification to other mobile search server nodes in the network. If the server saves data of the managed logical nodes, the server needs to transfer the data to other servers in the network. The process is described in the following. First, the logical node needs to keep in touch with the mobile search server of a registration place of the vertical search engine managed by the logical node. When the mobile search server of the registration place detects that the logical node is invalid, the logical node is re-mapped to other mobile search servers by using the DHT algorithm again. Then, the process of registering the mobile search server in the logical node is re-performed, and the new logical node manages the information of the vertical search engines of the attribute information.

Through the steps from step 101 to step 103, the establishing of the association relation between the logical node and the mobile search server by adopting the DHT technology is implemented. Advantages of the method are described as follows: Mobile search servers are not required to maintain information of the whole network, and the mobile search server stores only information of the adjacent successive mobile search server, so that a target mobile search server can be reached with less routing information.

A second method for establishing the association relation between the logical node and the mobile search server through a directory server is described in the following. Following describes the specific process.

Figure 5:
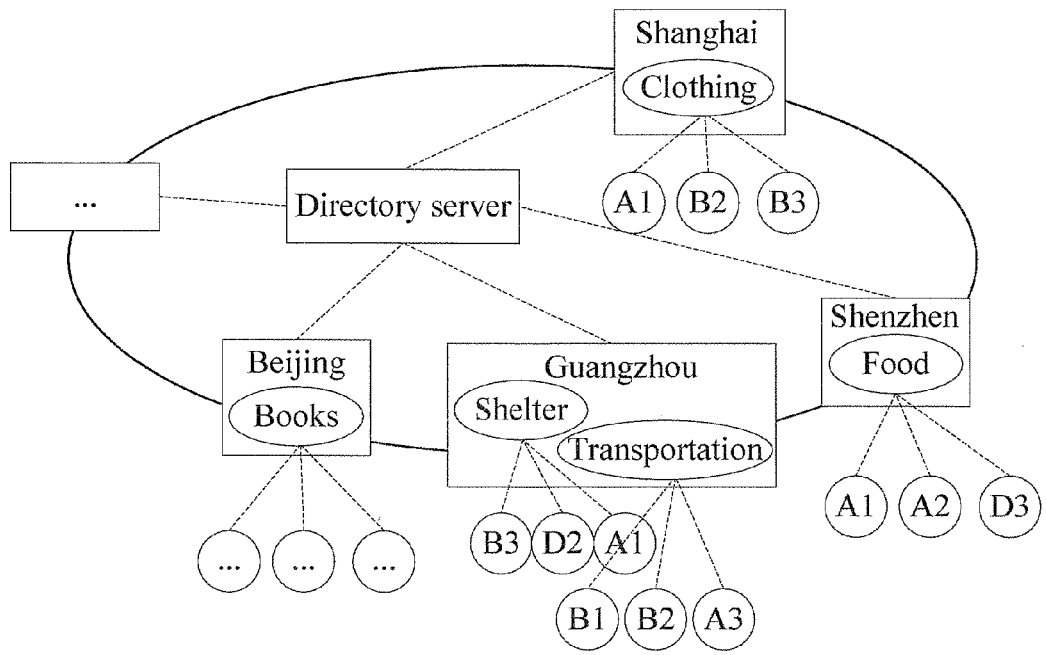
FIG. 5 is a schematic structural view of a network of a directory server according to the first embodiment of the present invention.

Referring to FIG. 5, the directory server records capability information and address information of all mobile search servers in the network, such as network access bandwidth, a processor dominant frequency, Quality of Service (QoS), memory capacity, external storage access delay, and an IP address. The association relation between the logical node and the mobile search server is established according to the capability information and the address information of the mobile search servers. As shown in FIG. 5, a logical node being food corresponds to an IP address of a mobile search server of Shenzhen, and the mobile search server in which the logical node is located is found quickly by using the method. When a logical node of new attribute information is added, the directory server determines a mobile search server that is used to save the logical node, according to the capability information and the address information of the mobile search servers in the network, and establishes the association relation between the logical node and the mobile search server.

When the new mobile search server is added in the network, information of the new mobile search server is registered in the directory server, such as network access bandwidth, a processor dominant frequency, QoS, memory capacity, external storage access delay, and an IP address. The directory server manages the network resources uniformly, establishes a mapping relation between the logical node and the new mobile search server, and adjusts the mapping relation between the logical node and other mobile search servers. When a mobile search server node in the network is invalid, the directory server is notified, and the directory server re-allocates information of logical nodes saved in the invalid mobile search server node, and updates the mapping relation between the logical nodes and other mobile search servers.

Multiple directory servers may exist. When the number of directory servers increases with the increasing scale of nodes in the network, the multiple directory servers are interconnected to form a director server network, in which each directory server can provide directory query services according to territories or attribute information.

In the method for interconnecting the mobile search servers according to this embodiment, the mobile search servers are interconnected by establishing the association relation between the logical node and the mobile search server, so that the information is shared.

Figure 6:
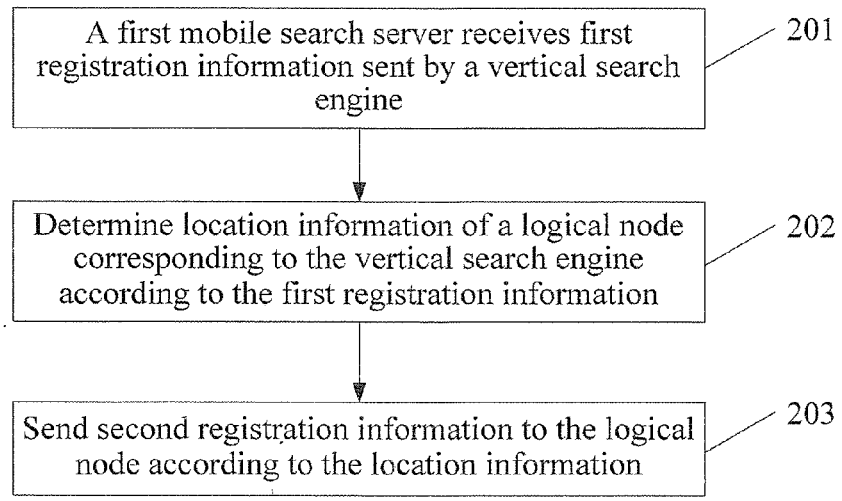
FIG. 6 is a flow chart of a method for registering a vertical search engine in a logical node according to the first embodiment of the present invention.

The method for establishing the association relation between the logical node and the mobile search server is described. If the vertical search engine is managed by the mobile search server, the vertical search engine needs to be registered with the mobile search server and corresponding logical nodes in advance. Referring to FIG. 6, the specific process is described in the following.

Step 201: A mobile search server receives first registration information sent by a vertical search engine.

Specifically, the first registration information includes address information (such as IP address information) of the vertical search engine, information of territories served by the vertical search engine, service information (such as service type information) and meta index (descriptive information) provided by the vertical search engine.

Step 202: Determine location information of a logical node corresponding to the vertical search engine according to the first registration information.

Specifically, the logical node corresponding to the vertical search engine is determined according to the service type information in the first registration information. The location information of the logical node is determined to be address information of a second mobile search server according to a pre-established association relation between the second mobile search server and the logical node. Furthermore, specifically the method for establishing the association relation may be the method described in steps from step 101 to step 103 or the method for interconnecting mobile search servers by adopting a directory server, and is not described herein.

Step 203: Send second registration information to the logical node according to the location information.

Specifically, the second registration information includes: the address information (such as IP address information) of the vertical search engine, the address information of the mobile search server (such as IP address information), the information of territories served by the vertical search engine, and the service type information or the meta index (descriptive information) provided by the vertical search engine.

Figure 7:
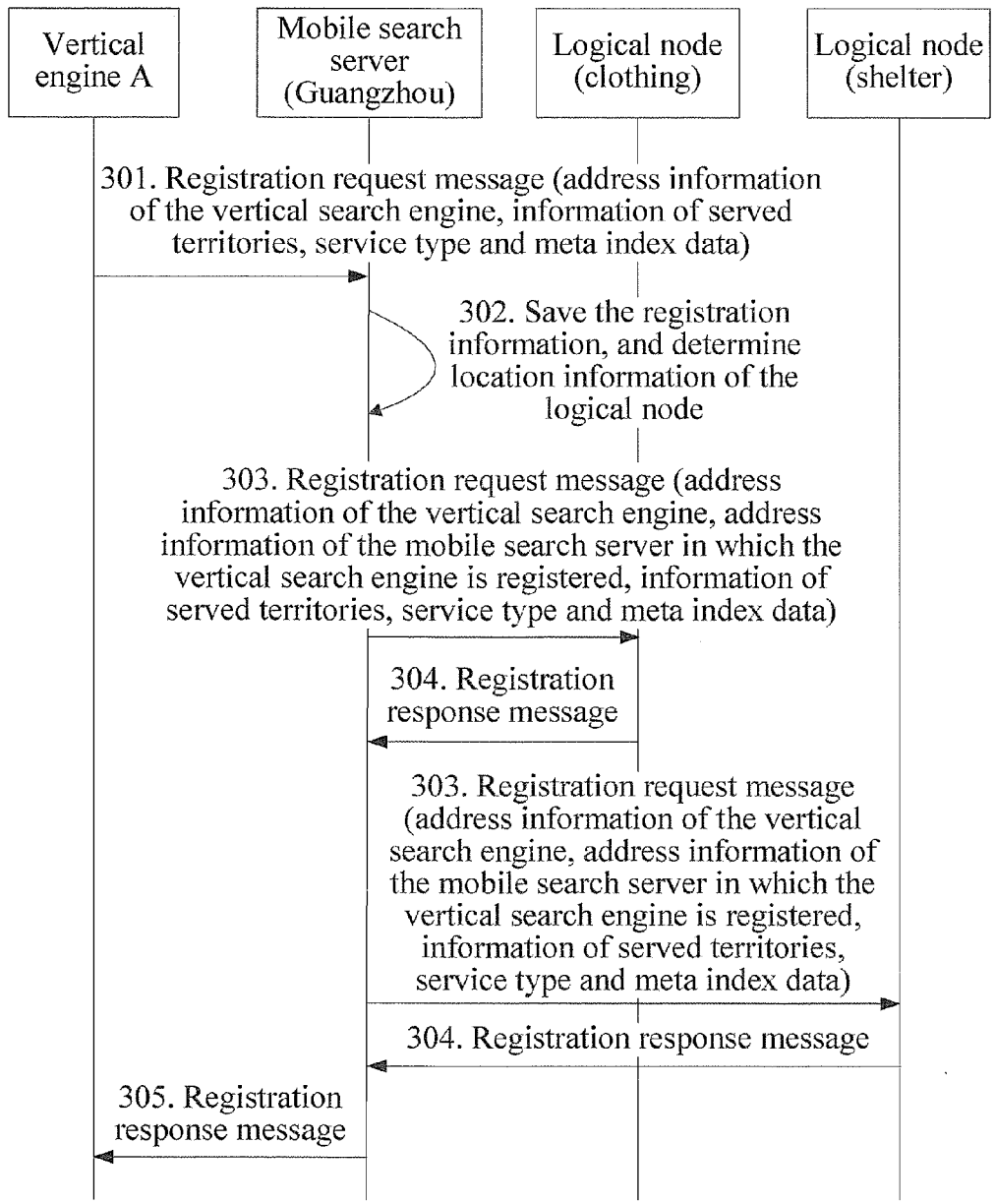
FIG. 7 is schematic diagram of signaling exchanges of registering a vertical search engine in a logical node according to the first embodiment of the present invention.

Taking a vertical search engine A as an example, the vertical search engine A provides food and shelter search in Shenzhen, and is registered in a mobile search server of Guangzhou. Referring to FIG. 7, the registration process is described in the following.

Step 301: The vertical search engine A sends a registration request message to a local mobile search server (Guangzhou).

The registration request message includes registration information, such as service types (food and shelter) and meta index of the vertical search engine A, IP address information of the vertical search engine A, and territorial information (Shenzhen) of services.

Step 302: The mobile search server (Guangzhou) saves the registration information, determines the mobile search server in which the logical node corresponding to the registration information is located (it is assumed here that a logical node being food is mapped to a mobile search server of Shanghai, and a logical node being shelter is mapped to a mobile search server of Guangzhou).

Specifically, the logical node corresponding to the vertical search engine is determined according to the registration information. Location information of the logical node is determined to be address information of the second mobile search server according to a pre-established association relation between the second mobile search server and the logical node.

Step 303: The mobile search server (Guangzhou) sends a registration request message to corresponding logical nodes (food and shelter). The registration request message includes: address information of a vertical search engine, address information of a mobile search server in which the vertical search engine is registered, information of served territories, service types (food and shelter), meta index, and other registration information.

Step 304: The logical nodes (food and shelter) send a registration response message to the mobile search server (Guangzhou) of the registration place.

Step 305: The mobile search server (Guangzhou) of the registration place sends a registration response message to the vertical search engine A to notify the vertical search engine A of registration result information, such as information indicating a success or a failure.

Furthermore, the vertical search engine may serve multiple territories and provide multiple service types. When multiple territories are served, the information of served territories in the registration information records multiple pieces of information of served territories. When multiple service types are supported, the service types in the registration information record the multiple provided service types. During specific implementation, registration may be performed directly in the corresponding logical node, or be performed by using the method of virtual registration in the logical node. The so-called virtual registration means that the mobile search server of the registration place sends a notification message to the mobile search server of the served territory.

In the method for registration according to this embodiment, the registration information of the vertical search engine is sent to the corresponding logical node, so that the vertical search engines that are registered in different territories and provide the same attribute information are managed and dispatched uniformly. In this way, the information is shared.

Second Embodiment

Figure 8:
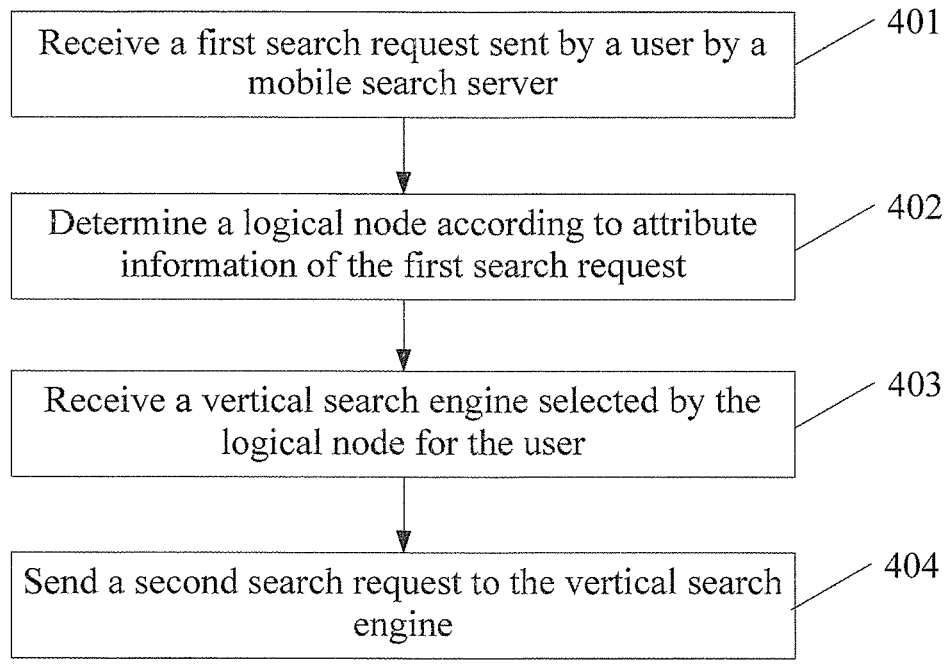
FIG. 8 is a flow chart of a method for searching for information according to a second embodiment of the present invention.

In the embodiment, the present invention provides a method for searching for information. The method is implemented after an association relation between a mobile search server and a logical node in a network is established, and a vertical search engine is already registered according to the first embodiment. Referring to FIG. 8, a process that a mobile search server searches for information is described in the following.

Step 401: Receive a first search request sent by a user.

Step 402: Determine a logical node according to attribute information in the first search request.

Furthermore, location information of the logical node is also required to be determined according to the pre-established association relation between each mobile search server and each logical node in the network. A search request is sent to the logical node of the location information, the logical node selects a vertical search engine according to the search request, and following describes the specific selecting process.

1) If the logical node saves registration information of vertical search engines, the logical node compares a degree of similarity between the registration information of each vertical search engine stored by the logical node and the search request, and selects a vertical search engine with the highest degree of similarity.

2) When the mobile search servers save registration information of vertical search engines, the logical node sends a request message to mobile search servers with which each vertical search engine is registered, in which the request message includes a search condition and identification information of the vertical search engines registered in the mobile search servers.

The mobile search servers receiving the request message calculate the degree of similarity between the vertical search engines corresponding to the identification information and the search condition, and send the degree of similarity to the logical node.

The logical node receives the degree of similarity returned by each mobile search server, and selects the vertical search engine with the highest degree of similarity.

Step 403: Receive the vertical search engine selected by the logical node for the user.

Furthermore, one or more vertical search engines may be selected for the user.

Step 404: Send a second search request to the vertical search engine.

Specifically, the sending can be performed in a direct manner or in an indirect manner. In the indirect manner, the second search request is sent to the vertical search engine through the mobile search server in which the vertical search engine is registered; and in the direct manner, the second search request is directly sent to the vertical search engine.

The logical node stores information of vertical search engines of the same attribute information in the network. Specifically, the attribute information includes service information; or service information and territorial information; or service information, territorial information, and operator identification.

In the method for searching for information according to this embodiment, the vertical search engines that are registered in different territories and provide the same service are managed uniformly through the logical node, so that the information is shared and the resources are prevented from being wasted.

In the following, the process is described in detail with a specific instance. For sake of convenience, it is assumed that a search condition input by a user is Shanghai, hotels, and the user sends a search request to a mobile search server of Shenzhen.

Step 501: The mobile search server (Shenzhen) receives the search request message submitted by the user, in which the search request message includes the search condition and other information input by the user, for example: Shanghai, hotels.

Step 502: The mobile search server determines attribute information and territorial information of the search request according to content of the search request message, determines a mobile search server in which a logical node corresponding to the attribute information is located, and sends the search request message to the logical node, in which the search request message includes the search condition, service types and meta index, territorial information and location information of the logical node (such as address information of the mobile server in which the logical node is located).

Specifically, in this embodiment, the search condition is Shanghai, hotels, the service type is shelter, the territorial information is Shanghai, and the physical address information of the logical node being shelter is address information of a mobile search server of Guangzhou, such as, an IP address.

Furthermore, the territorial information may be obtained directly from the search request message, or may be obtained from registration information of the user, or may also be determined according to location information of the user.

Furthermore, specifically two manners are provided for determining the mobile search server in which the logical node is according to different manners for establishing an association relation. In one manner, the mobile search server in which the logical node is located is determined according to a hash algorithm. In the other manner, the mobile search server submits the attribute information to a directory server, and the directory server returns IP address information of the mobile search server corresponding to the logical node of the attribute information.

In order to quickly locate a physical node to which the logical node is mapped, the mobile search server caches a mapping relation between the logical node and the mobile search server, so as to quickly search for the physical node.

Figure 9:
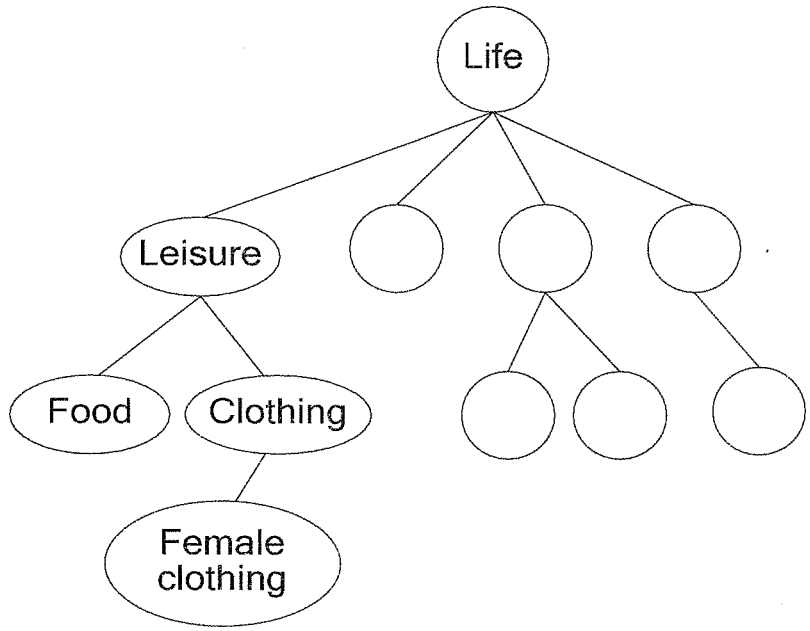
FIG. 9 is a schematic structural view of a service type tree in a mobile search server according to the second embodiment of the present invention.

Furthermore, the logical node may also be quickly located by storing a service type tree structure in each mobile search server. Each node in the service type tree represents a logical node corresponding to a service type, and each node stores physical address information of the mobile search server in which the logical node is located, such as an IP address. The service tree structure is stored in each mobile search server in a mobile search network, and the mobile search server (a physical node) in which the logical node is located can be found quickly through a mapping relation between a service type and a physical address. Referring to FIG. 9, it is assumed that a physical address corresponding to a planned leisure node is IP1, a physical address corresponding to a food node is IP2, and a physical address corresponding to a clothing node is IP3. When a request is received, a physical address corresponding to a service type is determined in the service type tree structure, and location of a logical node of the type can be directly located through the physical address, for example, information of a logical node being food can be found at the address IP3. If the address IP3 corresponding to the food node is invalid, information of the food node is stored in the physical address IP1 corresponding to its parent node, that is, the leisure node, and the information of food node can be found directly in the address IP1. When a new type node is added, information of the logical node is allocated to a physical address corresponding to the new node, for example, a service type being female clothing is newly allocated under a service type being clothing, a physical address of the logical node being female clothing is IP4, and then all information related to female clothing can be found at the address IP4. In a mobile search network, type tree structures need to be synchronized in the mobile search network only when types in the service type trees are expanded or modified.

Step 503: A logical node (shelter) selects a suitable vertical search engine, so as to return information (address information) of the selected vertical search engine and address information of the mobile search server of its registration place to the mobile search server.

Figure 10:
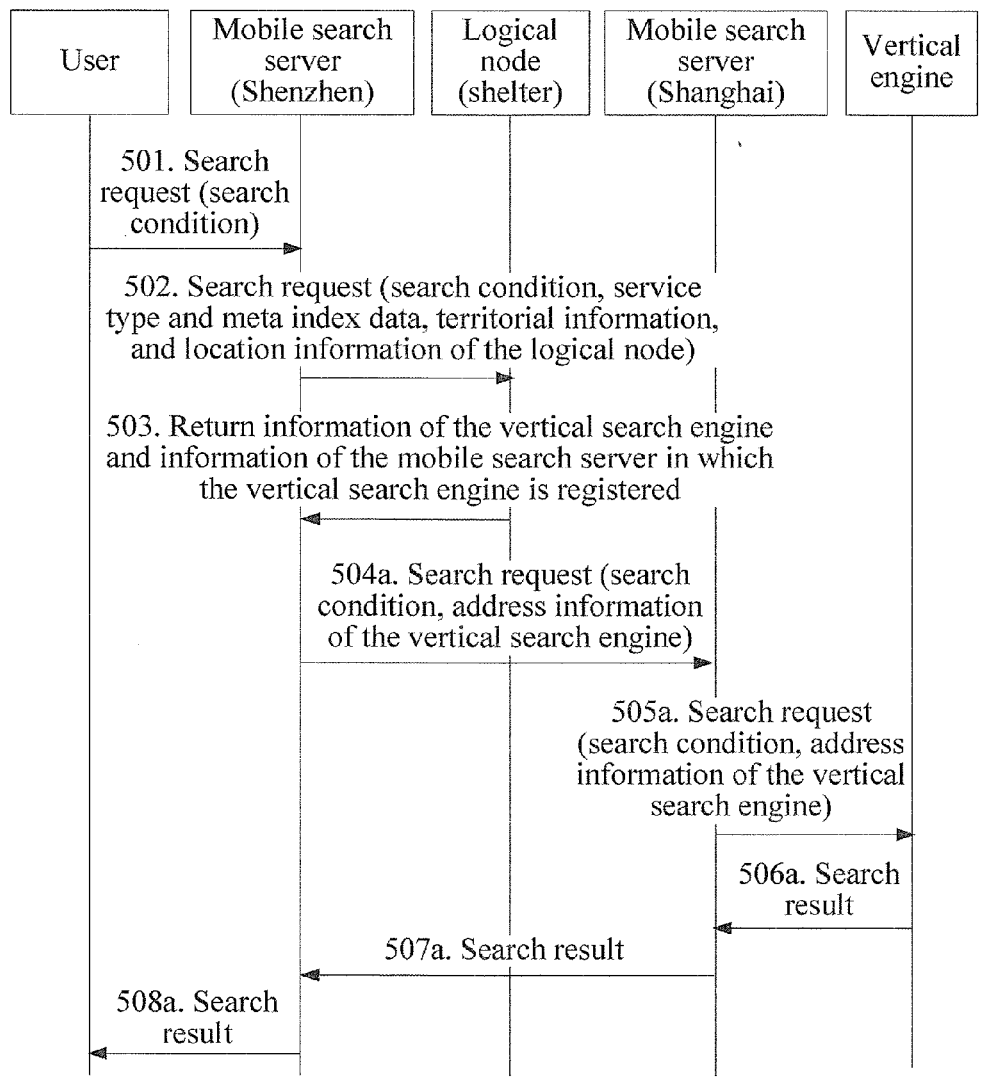
FIG. 10 is a schematic diagram of signaling exchanges of searching for information in an indirect manner according to the second embodiment of the present invention.

The manners of forwarding the search request message by the mobile search server include an indirect manner and a direct manner. Referring to FIG. 10, the indirect forwarding manner is described, and the process specifically includes step 504a to step 508a.

Step 504a: A mobile search server (Shenzhen) submits a search request message to a mobile search server (Shanghai) in which the selected vertical search engine is registered. The search request message includes a search condition and address information of the vertical search engine, and the search request message may also include personalized information of a user, such as, information related to search history of the user, so that it is convenient for the user to perform personalized searching.

Step 505a: The mobile search server (Shanghai) forwards the search request message to the vertical search engine, in which the search request message includes a search condition and address information of the vertical search engine, and may also include personalized information of a user, such as, information related to search history of the user, so that it is convenient for the user to perform personalized searching.

Step 506a: The vertical search engine performs retrieving according to the search condition, and returns a retrieval result to the mobile search server (Shanghai).

Step 507a: The mobile search server (Shanghai) returns the search result to the mobile search server (Shenzhen).

Step 508a: The mobile search server (Shenzhen) processes the search result according to the personalized information, and returns a processed result to the user.

Figure 11:
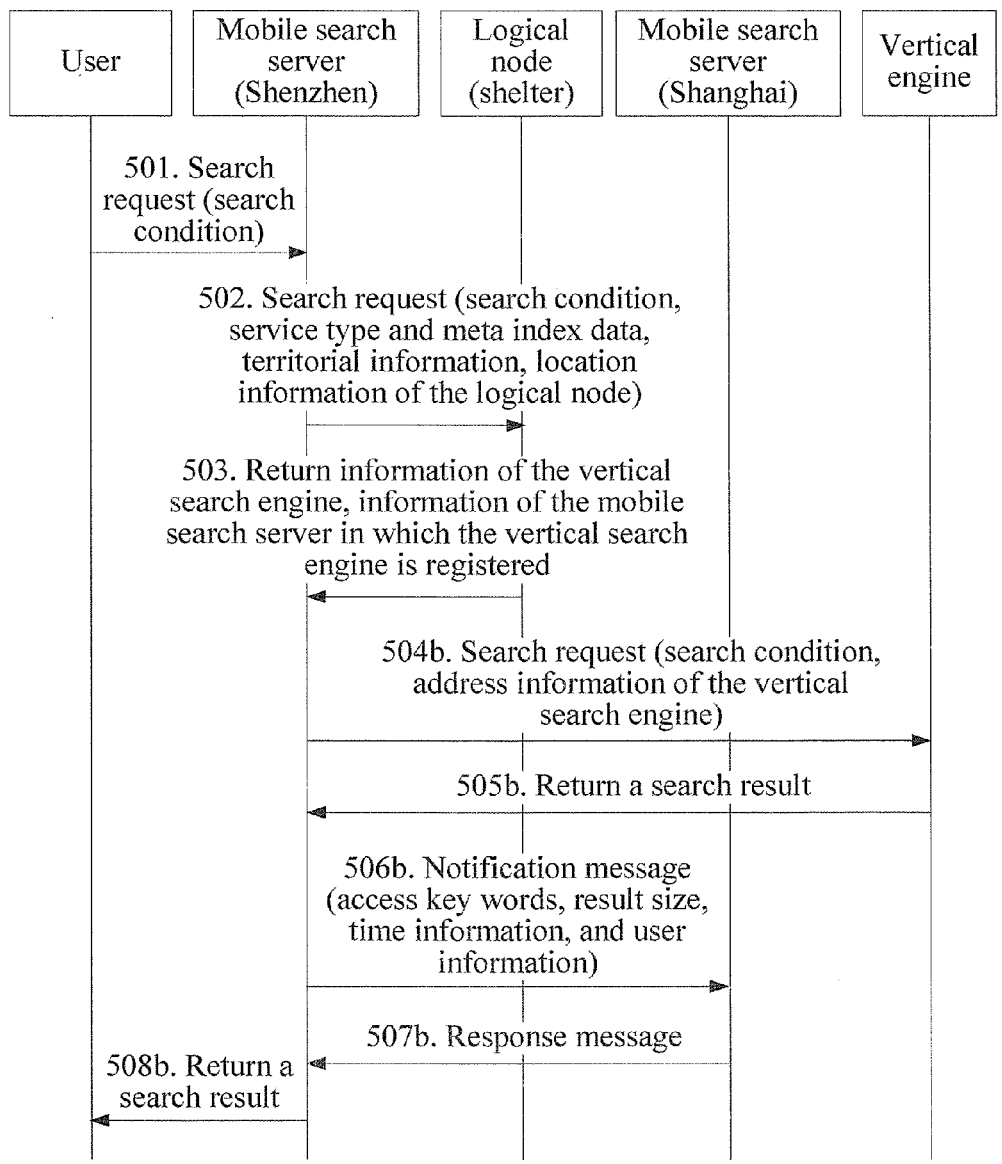
FIG. 11 is a schematic diagram of signaling exchanges of searching for information in a direct manner according to the second embodiment of the present invention.

Referring to FIG. 11, the direct forwarding manner is described, and the process specifically includes step 504b to step 508b.

Step 504b: The mobile search server (Shenzhen) submits the search request message to the selected vertical search engine, in which the search request message includes a search condition and address information of the vertical search engine, and may also include personalized information of a user, such as, information related to search history of the user, so that it is convenient for the user to perform personalized searching.

Step 505b: The vertical search engine returns a search result to the mobile search server (Shenzhen).

Step 506b: The mobile search server (Shenzhen) sends a notification message to the mobile search server (Shanghai) in which the vertical search engine is registered, in which the content of the notification message includes access keywords, result size, time information, and user information.

Step 507b: The mobile search server (Shanghai) returns a response message to the mobile search server (Shenzhen).

Step 508b: The mobile search server (Shenzhen) processes the search result, and returns the processed result to the user.

Through the steps from step 501 to step 508a or the steps from step 501 to step 508b, the mobile search server completes the process of processing the search request from the user and returning the search result to the user.

In the method for searching for information according to this embodiment, the vertical search engines that are registered in different territories and provide the same attribute information are managed uniformly through the logical node, so that the information is shared and the resources are prevented from being wasted.

Third Embodiment

Figure 12:
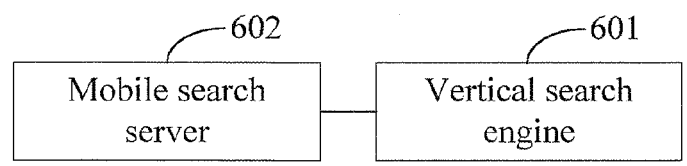
FIG. 12 is a schematic structural view of a system for registering a vertical search engine according to a third embodiment of the present invention.

The present invention provides a system for registering a vertical search engine. Referring to FIG. 12, the system includes a vertical search engine 601 and a mobile search server 602.

The vertical search engine 601 is configured to send first registration information to the mobile search server 602.

The mobile search server 602 is configured to receive and save the first registration information sent by the vertical search engine 601, determine location information of a logical node corresponding to the vertical search engine according to the first registration information, and send second registration information to the logical node according to the location information, in which the logical node stores information of vertical search engines of the same attribute information in a network.

Specifically, the first registration information includes address information (such as IP address information) of the vertical search engine 601, information of territories served by the vertical search engine 601, service type information and meta index (descriptive information) provided by the vertical search engine 601.

Specifically, the second registration information includes the first registration information and address information of the mobile search server 602. Specifically, the second registration information includes: the address information (such as IP address information) of the vertical search engine 601, the address information (such as IP address information) of the mobile search server, the information of territories served by the vertical search engine 601, the service type or the meta index (descriptive information) provided by the vertical search engine 601.

This embodiment of the present invention and the first embodiment are of the same idea of the invention, for the detailed description of the mobile search server, please refer to the first embodiment, and the description is not repeated herein.

In the system for registering the vertical search engine according to this embodiment, the registration information of the vertical search engine is sent to the corresponding logical node, so the vertical search engines that are registered in different territories and provide the same attribute information are managed and dispatched uniformly. In this way, the information is shared.

Fourth Embodiment

Figure 13:
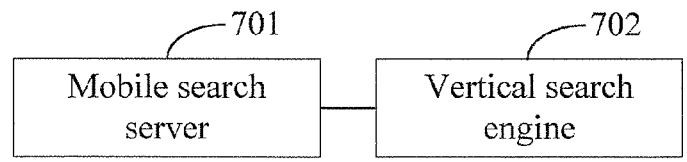
FIG. 13 is a schematic structural view of a system for searching for information according to a fourth embodiment of the present invention.

The present invention provides a system for searching for information. Referring to FIG. 13, the system includes a mobile search server 701 and a vertical search engine 702.

The mobile search server 701 is configured to receive a first search request sent by a user, determine a logical node according to attribute information in the first search request, receive information of a vertical search engine selected by the logical node for the user, and send a second search request to the vertical search engine, in which the logical node stores information of vertical search engines of the same attribute information in a network.

The vertical search engine 702 is configured to receive the second search request sent by the mobile search server.

Furthermore, the mobile search server 701 is further configured to determine location information of the logical node according to an association relation between each mobile search server and each logical node in the network, and send a search request to the logical node of the location information, in which the logical node selects the vertical search engine according to the search request.

Furthermore, the mobile search server 701 is further configured to send the second search request to the vertical search engine through a mobile search server in which the vertical search engine 702 is registered; or directly send the second search request to the vertical search engine 702 and send a notification message to the mobile search server in which the vertical search engine 702 is registered, in which the notification message includes access keywords, result size, time information, and user information.

Figure 14:
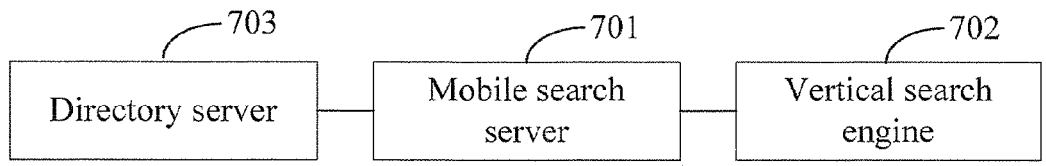
FIG. 14 is a schematic structural view of another system for searching for information according to the fourth embodiment of the present invention.

Furthermore, referring to FIG. 14, the system further includes a directory server 703, configured to record capability information and address information of each mobile search server in the network; establish an association relation between each mobile search server and each logical node according to the capability information and the address information; and determine that location information of the logical node is the address information of the mobile search server related to the logical node according to the association relation.

This embodiment of the present invention and the second embodiment are of the same idea of the invention, for the detailed description of the mobile search server, please refer to the second embodiment, and the description is not repeated herein.

In the system for searching for information according to this embodiment, the vertical search engines that are registered in different territories and provide the same attribute information are managed uniformly through the logical node, so that the information is shared and the resources are prevented from being wasted.

Fifth Embodiment

Figure 15:
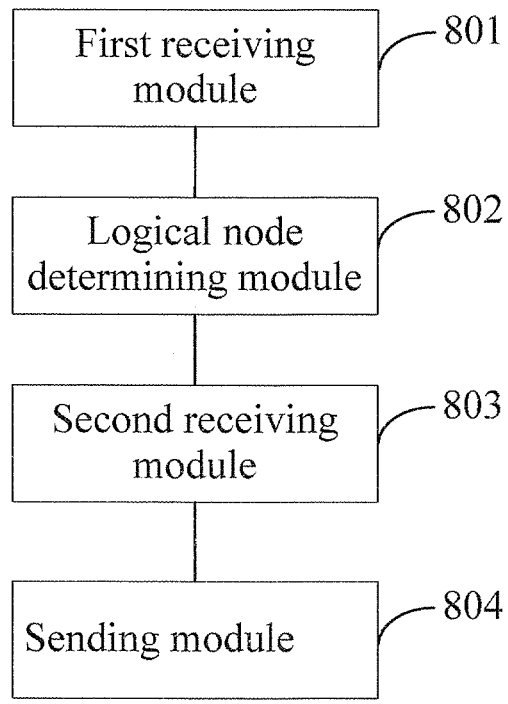
FIG. 15 is a schematic structural view of a mobile search server according to a fifth embodiment of the present invention.

The present invention provides a mobile search server. Referring to FIG. 15, the mobile search server includes a first receiving module 801, a logical node determining module 802, a second receiving module 803, and a sending module 804.

The first receiving module 801 is configured to receive a first search request sent by a user.

The logical node determining module 802 is configured to determine a logical node according to attribute information in the first search request received by the first receiving module 801.

The second receiving module 803 is configured to receive information of a vertical search engine selected by the logical node determined by the logical node determining module 802 for the user.

The sending module 804 is configured to send a second search request to the vertical search engine received by the second receiving module 803.

The logical node stores information of vertical search engines of the same attribute information in a network.

Furthermore, the server further includes a relevance relation module.

The relevance relation module is configured to establish an association relation between each mobile search server and each logical node, and determine location information of the logical node according to the association relation.

Furthermore, the sending module 804 is further configured to send a search request to the logical node, and the logical node selects a vertical search engine according to the search request.

In the mobile search server according to this embodiment, the vertical search engines that are registered in different territories and provide the same attribute information are managed uniformly through the logical node, so that the information is shared and the resources are prevented from being wasted.

Figure 16:
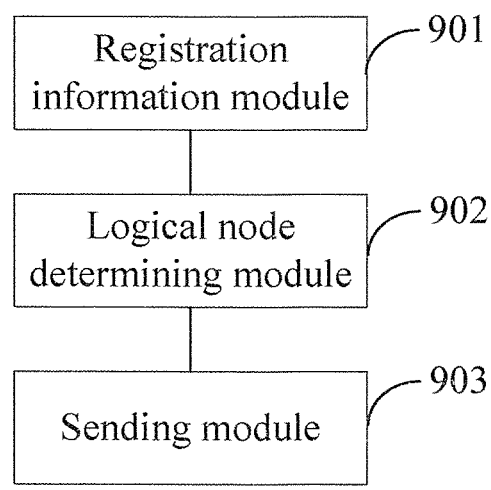
FIG. 16 is a schematic structural view of another mobile search server according to the fifth embodiment of the present invention.

The present invention further provides a mobile search server. Referring to FIG. 16, the mobile search server includes a registration information module 901, a logical node determining module 902, and a sending module 903.

The registration information module 901 is configured to receive and save first registration information sent by a vertical search engine.

The logical node determining module 902 is configured to determine location information of a logical node corresponding to the vertical search engine according to the first registration information received by the registration information module 901.

The sending module 903 is configured to send second registration information to the logical node according to the location information determined by the logical node determining module 902.

The logical node stores information of vertical search engines of the same attribute information in a network.

Specifically, the first registration information includes a service type and meta index of the vertical search engine, address information of the vertical search engine, and information of territories served by the vertical search engine.

The second registration information includes the service type and the meta index of the vertical search engine, the address information of the vertical search engine, the information of territories served by the vertical search engine, and the address information of the mobile search server.

In the mobile search server according to this embodiment, the vertical search engines that are registered in different territories and provide the same attribute information are managed uniformly through the logical node, so that the information is shared and the resources are prevented from being wasted.

Figure 17:
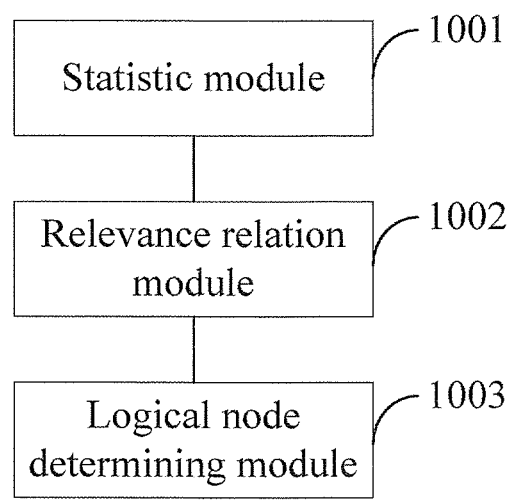
FIG. 17 is a schematic structural view of a directory server according to the fifth embodiment of the present invention.

The present invention further provides a directory server. Referring to FIG. 17, the directory server includes a statistic module 1001, a relevance relation module 1002, and a logical node determining module 1003.

The statistic module 1001 is configured to record capability information and address information of each mobile search server in a network.

The relevance relation module 1002 is configured to establish an association relation between each mobile search server and each logical node in the network according to the capability information and the address information recorded by the statistic module 1001.

The logical node determining module 1003 is configured to determine that location information of the logical node is address information of the mobile search server related to the logical node according to the association relation established by the relevance relation module 1002.

In the directory server according to this embodiment, the location information of the logical node is determined according to the association relation between the mobile search server and the logical node, and the vertical search engines that are registered in different territories and provide the same attribute information are managed uniformly through the logic node, so that the information is shared and the resources are prevented from being wasted.

Figure 18:
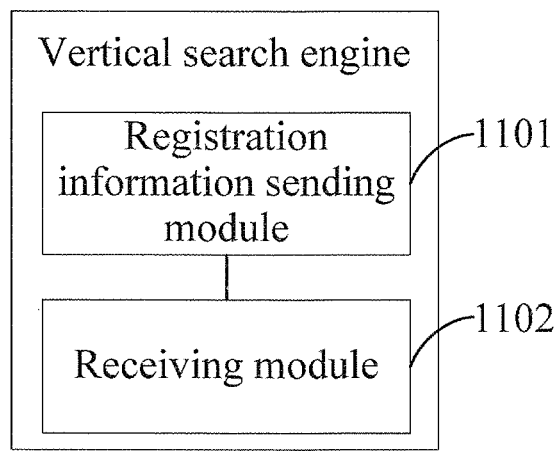
FIG. 18 is a schematic structural view of a vertical search engine according to the fifth embodiment of the present invention.

The present invention further provides a vertical search engine. Referring to FIG. 18, the vertical search engine includes a registration information sending module 1101 and a receiving module 1102.

The registration information sending module 1101 is configured to send registration information to a mobile search server, in which the registration information includes a service type and meta index of the vertical search engine, address information of the vertical search engine, and information of territories served by the vertical search engine.

The receiving module 1102 is configured to receive a response message returned by the mobile search server.

This embodiment of the present invention, the first embodiment, and the second embodiment are of the same idea of the invention, for the detailed description of the mobile search server, the directory server and the vertical search engine, please refer to the first embodiment and the second embodiment, and the description is not repeated herein.

In the vertical search engine according to the present invention, the registration information is sent to the corresponding logic node, so that the vertical search engines that are registered in different territories and provide the same attribute information are managed and dispatched uniformly. In this way, the information is shared.

All or part of the technical solution provided in the embodiments of the present invention may be implemented by software programming. The software program may be stored in a readable storage medium, such as a hard disk, a Compact Disk-Read Only Memory (CD-ROM), or a floppy disk.

The above descriptions are merely preferred embodiments of the present invention, but not intended to limit the scope of the present invention. Any modification, equivalent replacement, or improvement made without departing from the principle of the present invention should fall within the scope of the present invention.

What is claimed is:

1. A method for searching for information, the method comprising:
    receiving a first search request sent by a user;
    determining a logical node according to attribute information in the first search request;
    determining location information of the logical node according to an association relation between each mobile search server and each logical node in the network;
    sending a search request to the logical node of the location information, so that the logical node selects the vertical search engine according to the search request;
    receiving a vertical search engine selected by the logical node for the user; and
    sending a second search request to the vertical search engine;
    wherein, the logical node stores information of vertical search engines of the same attribute information in a network.

2. The method for searching for information according to claim 1, wherein the determining the location information of the logical node according to the association relation between each mobile search server and each logical node in the network comprises:
    generating a first hash value according to first relevance information of each mobile search server;
    generating a second hash value according to second relevance information of each logical node;
    establishing the association relation between each mobile search server and each logical node in the network by using the first hash value and the second hash value; and
    determining that the location information of the logical node is address information of the mobile search server related to the logical node according to the association relation.

3. The method for searching for information according to claim 1, wherein the determining the location information of the logical node according to the association relation between each mobile search server and each logical node in the network comprises:
recording, by a directory server, capability information and address information of each mobile search server in the network;
establishing the association relation between each mobile search server and each logical node in the network according to the capability information and the address information; and
determining that the location information of the logical node is the address information of the mobile search server related to the logical node according to the relevance relation.

4. The method for searching for information according to claim 1, wherein the selecting, by the logical node, the vertical search engine according to the search request comprises:
comparing, by the logical node, a degree of similarity between registration information of each vertical search engine stored by the logical node and the search request, and
selecting the vertical search engine with the highest degree of similarity;
or
the selecting, by the logical node, the vertical search engine according to the search request comprises:
sending, by the logical node, a request message to the mobile search server in which each vertical search engine is registered, wherein the request message comprises a search condition and identification information of the vertical search engine registered in the mobile search server;
calculating, by the mobile search server receiving the request message, a degree of similarity between the vertical search engine corresponding to the identification information and the search condition, and
sending the degree of similarity to the logical node; and
receiving, by the logical node, the degree of similarity returned by each mobile search server, and selecting the vertical search engine with the highest degree of similarity.

5. The method for searching for information according to claim 1, wherein after the sending the second search request to the vertical search engine, the method further comprises:
sending a notification message to the mobile search server in which the vertical search engine is registered, wherein the notification message comprises access keywords, result size, time information, and user information.

6. A method for registering a vertical search engine, the method comprising:
receiving and saving, by a mobile search server, first registration information sent by the vertical search engine;
determining location information of a logical node corresponding to the vertical search engine according to the first registration information;
sending second registration information to the logical node according to the location information; and
wherein, the logical node stores information of vertical search engines of the same attribute information in a network.

7. The method for registering a vertical search engine according to claim 6, wherein the determining the location information of the logical node corresponding to the vertical search engine according to the first registration information comprises:
determining the logical node corresponding to the vertical search engine according to the first registration information; and
determining the location information of the logical node according to an association relation between each mobile search server and each logical node in the network.

8. The method for registering a vertical search engine according to claim 7, wherein the determining the location information of the logical node according to the association relation between each mobile search server and each logical node in the network comprises:
recording, by a directory server, capability information and address information of each mobile search server in the network;
establishing the association relation between each mobile search server and each logical node in the network according to the capability information and the address information; and
determining that the location information of the logical node is the address information of the mobile search server related to the logical node according to the association relation.

9. The method for registering a vertical search engine according to claim 7, wherein the association relation is a service type tree, and the service type tree is stored in each mobile search server in the network.

10. The method for registering a vertical search engine according to claim 7, wherein the determining the location information of the logical node according to the association relation between each mobile search server and each logical node in the network comprises:
generating a first hash value according to first relevance information of each mobile search server;
generating a second hash value according to second relevance information of each logical node;
establishing the association relation between each mobile search server and each logical node by using the first hash value and the second hash value; and
determining that the location information of the logical node is address information of the mobile search server related to the logical node according to the association relation.

11. The method for registering a vertical search engine according to claim 10, wherein the first relevance information comprises: identification information or address information of the mobile search server.

12. The method for registering a vertical search engine according to claim 6, wherein the first registration information further comprises: a service type and meta index of the vertical search engine, address information of the vertical search engine, and information of territories served by the vertical search engine.

13. The method for registering a vertical search engine according to claim 6, wherein the second registration information comprises: the service type and the meta index of the vertical search engine, the address information of the vertical search engine, the information of territories served by the vertical search engine, and the address information of the mobile search server.

14. For registering a vertical search engine, a computer program product stored on a non-transitory computer readable storage medium comprising computer executable instructions that when executed implement the following:
receiving and saving, by a mobile search server, first registration information sent by the vertical search engine;

determining location information of a logical node corresponding to the vertical search engine according to the first registration information; and sending second registration information to the logical node according to the location information; wherein, the logical node stores information of vertical search engines of the same attribute information in a network.

15. The computer program product according to claim 14, wherein the determining the location information of the logical node corresponding to the vertical search engine according to the first registration information comprises: determining the logical node corresponding to the vertical search engine according to the first registration information; and determining the location information of the logical node according to an association relation between each mobile search server and each logical node in the network.

16. The computer program product according to claim 15, wherein the determining the location information of the logical node according to the association relation between each mobile search server and each logical node in the network comprises:

recording, by a directory server, capability information and address information of each mobile search server in the network;

establishing the association relation between each mobile search server and each logical node in the network according to the capability information and the address information; and determining that the location information of the logical node is the address information of the mobile search server related to the logical node according to the association relation.

17. The computer program product according to claim 15, wherein the association relation is a service type tree, and the service type tree is stored in each mobile search server in the network.

18. The computer program product according to claim 15, wherein the determining the location information of the logical node according to the association relation between each mobile search server and each logical node in the network comprises:

generating a first hash value according to first relevance information of each mobile search server;

generating a second hash value according to second relevance information of each logical node;

establishing the association relation between each mobile search server and each logical node by using the first hash value and the second hash value; and determining that the location information of the logical node is address information of the mobile search server related to the logical node according to the association relation.

19. The computer program product according to claim 18, wherein the first relevance information comprises: identification information or address information of the mobile search server.

20. The computer program product according to claim 14, wherein the first registration information further comprises:

a service type and meta index of the vertical search engine, address information of the vertical search engine, and information of territories served by the vertical search engine.

21. The computer program product according to claim 14, wherein the second registration information comprises: the service type and the meta index of the vertical search engine, the address information of the vertical search engine, the information of territories served by the vertical search engine, and the address information of the mobile search server.

\* \* \* \* \*